A. D. LEDOUX.
PROCESS OF CHLORIDIZING ORES.
APPLICATION FILED AUG. 13, 1912.
1,082,599.
Patented Dec. 30, 1913.
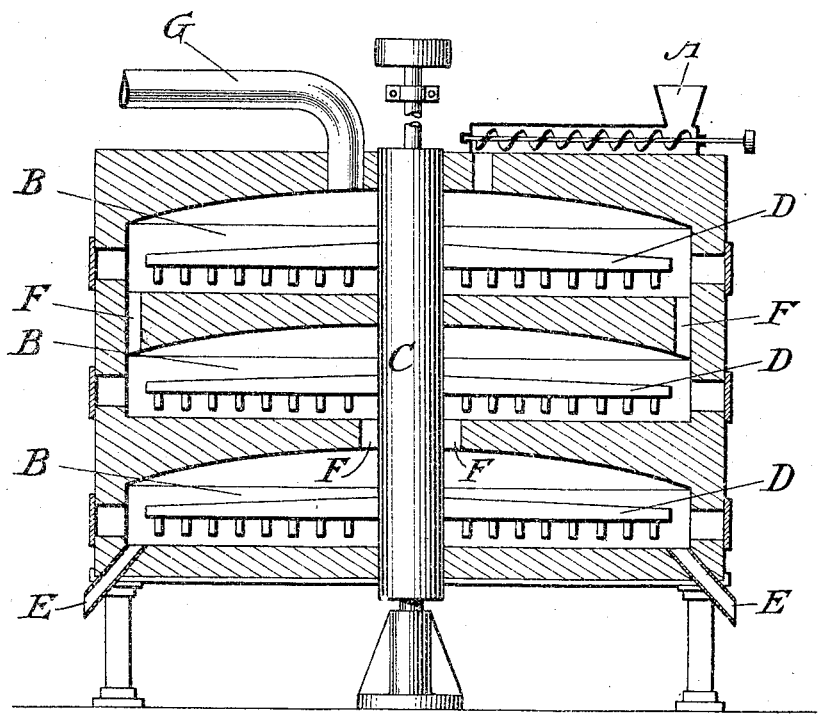

UNITED STATES PATENT OFFICE.

AUGUSTUS D. LEDOUX, OF SUMMIT, NEW JERSEY.

PROCESS OF CHLORIDIZING ORES.

1,082,599.  Specification of Letters Patent.  Patented Dec. 30, 1913.

Application filed August 13, 1912. Serial No. 714,783.

*To all whom it may concern:*

Be it known that I, AUGUSTUS D. LEDOUX, a citizen of the United States, residing at Summit, county of Union, and State of New Jersey, have invented certain new and useful Improvements in Processes of Chloridizing Ores, of which the following is a full, clear, and exact description.

The invention upon which this application for patent is based, is an improved process of treating with a chlorid, ores and residues containing valuable metals, from which most of the sulfur content has been eliminated by roasting.

While susceptible of much more general use, the improvement is particularly applicable to the treatment of the residues or cinders resulting from the roasting of copper bearing ores, such, for instance, as pyrites, and in illustration of its nature and purpose the description of the accompanying specification will be confined to such process.

The art of treating ores and residues containing sulfur for the purpose of rendering certain metals which they contain, such as copper and silver, susceptible to subsequent solution and recovery has been carried out in various ways, among them being the extensively used process of heating the mixture of ores or residues with a suitable proportion of chlorid of sodium, and subsequently lixiviating the chloridized material.

The mixture of ore or residues containing only a small proportion of sulfur, with salt, requires the application of heat from an extraneous source to induce chemical reaction, and this has heretofore been effected either through direct contact with combustion gases, or by heating the mixture in an inclosed hearth or muffle, through the walls of which the heat of the gases is communicated. In such processes, however, it is essential that the heating should not be excessive, and since the temperature is due to the combined effects of the applied heat and that of chemical reaction, special precautions must be observed, for any excess beyond that requisite for proper chloridizing obviously involves a waste of fuel, and leads to danger of loss through vaporization of the volatile chlorids of the metals which may be formed, and also to the formation of insoluble compounds.

To prevent the deleterious effects of overheating, a custom of long standing was to add the salt to the roasted ore after the latter has passed the zone of direct heating of the combustion gases, or, in furnaces in which the ore is roasted for sulfur removal, the salt has been added during the last stages of that roasting, and thoroughly incorporated by rabbling. The mixture was then discharged into another compartment or receptacle through an automatically operating opening and closing device which prevented the gases developed by chemical reaction from passing into the furnace from such compartment. The mixture contained in said second compartment, under such circumstances, became chloridized without further application of heat from any extraneous source. It has also been proposed to expedite the reaction by rabbling or mechanically stirring the mixture after it has passed into the second compartment.

Chloridizing being dependent upon the application of heat to induce chemical reaction, the roasted ores must first be heated and salt added, or the previously mixed ore and salt must be heated to start reaction, and in all cases heretofore, so far as I am informed, the process has always been carried on either by heating directly with combustion gases, or in a muffle, or by first inducing chemical reaction through direct or muffle heating with combustion gases and subsequently chloridizing in a separate compartment without the application of further heat from an extraneous source.

My improvement consists in a continuous process of chloridizing in which the employment or application of heat from an extraneous source, except only such as may be required in the initial application of such heat to start chemical reaction, is dispensed with, and in which the heat derived from such chemical reaction alone, is utilized to furnish the temperature necessary to induce chemical reaction in the ore thereafter fed into or through the furnace.

The process involving my invention may be carried out by the use of many well known types of apparatus. My preference is for a furnace patterned after the well known MacDougal type and containing two or more hearths, as may be found desirable, and in the accompanying drawing I have shown such a furnace for purposes of illustration.

The figure is a vertical central section of such a device.

A designates the usual or any convenient hopper or feeding device for introducing the mixture into the furnace.

B, B, B, are the superimposed hearths or compartments comprising the furnace.

C is a revolving shaft to which are secured the rakes D having teeth set at such an angle that they stir and at the same time advance the ore in its course through the furnace from the point of introduction, over the hearths B B and through openings F to the outlets E for the finished product. The openings F also serve as passages through which the reaction gases pass freely from one compartment or hearth to those above, although it will be understood that other or special passages for such gases may be provided, if so desired.

At the top of the device is an outlet G through which the gases issue and from which they may be led to a condensing apparatus or otherwise handled. As thus, or as otherwise constructed so that the reaction gases may be utilized to promote or aid reaction by their heat, the above described apparatus is used in carrying out my process in the following manner:

A charge of the mixture to be treated is either introduced and then started in reaction by heat applied in any well known way, or the furnace, previous to the introduction of a charge may receive a preliminary heating with combustion gases. In either case the rakes are started in rotation with the introduction of the ore and caused to spread, stir and advance the same, according to the angle of the teeth, toward the center or periphery of the hearths. The charge passes from the first to the second hearth through the peripherally located passages F, is again spread, stirred and advanced to the centrally located passages F through which it drops to the hearth below and so on to the final discharge.

The applied heat of combustion starts chemical reaction which increases as the charge progresses through the furnace. As soon as reaction has reached the proper degree, and the chloridizing process is well established, the application of extraneous heat from combustion gases or otherwise is wholly discontinued, the reaction gases alone being thereafter relied upon to furnish the heat necessary to induce chemical reaction in the mixture subsequently delivered into and advanced through the furnace. The process thus becomes continuous and complete without the further aid of heat from any extraneous source.

It is, of course, obvious that during the process additional chlorid or ore or both may be introduced at any point according as may be necessary for proper chloridization, and that air may be admitted to the hearths as may be found desirable.

It may be further stated that in the chloridizing of certain classes of ore it may be necessary to more fully conserve the reaction heat, for the better working of the process, or in other words, instead of relying solely upon the flow of reaction gas through the furnace, to more perfectly extract its heat, in any way well known, to permit of its more effective application. For example the waste heat may be employed to raise the temperature of the air admitted to the furnace, and in general the means and appliances which have heretofore been employed to keep the temperature down, in furnaces of the MacDougal type, I may utilize, for the distribution and application of the hot reaction gases or of air heated by them.

What I claim is:—

1. The process of chloridizing ores of the character herein described and for the purpose set forth, which consists in successively feeding the ore into and through a furnace, heating the initial part of the charge to induce therein chemical reaction, and thereafter inducing chemical reaction in the following portions of the charge by the heat of the established reaction in the furnace.

2. The process of chloridizing ores of the character herein described and for the purpose set forth, which consists in feeding continuously the ore into and through a furnace, applying to the ore initially introduced, heat from an external source to induce chemical reaction therein, and inducing chemical reaction in the ore thereafter introduced by the heat of the established reaction in the furnace.

3. The process of chloridizing ores of the character herein described and for the purpose set forth, which consists in successively feeding ore into and through a furnace, applying to the ore initially introduced, heat from an external source to induce chemical reaction therein, and heating by the reaction gases the ore thereafter introduced into the furnace.

4. The process of chloridizing ores of the character herein described and for the purpose set forth, which consists in successively feeding the ore into and through a furnace, applying to the ore initially introduced, heat from an external source to induce chemical reaction therein and passing the reaction gases back through the furnace to heat the ore thereafter introduced into the same.

5. The process of chloridizing ores of the character herein described and for the purpose set forth, which consists in successively feeding the ore into and through a furnace, inducing in the ore initially introduced chemical reaction by the heat of combustion gases, and heating the ore thereafter introduced by the gases from the established reaction.

In testimony whereof I affix my signature in the presence of two subscribing witnesses.

AUGUSTUS D. LEDOUX.

Witnesses:
M. LAWSON DYER,
B. R. SANDMAN.